L. JUNKER.
RIVET GAGE.
APPLICATION FILED NOV. 23, 1917.

1,287,040.

Patented Dec. 10, 1918.

Witness
J. Gordon Sparkes

Inventor
L. Junker
By
Attorney

UNITED STATES PATENT OFFICE.

LUDWIG JUNKER, OF SHEFFIELD, ALABAMA.

RIVET-GAGE.

1,287,040.

Specification of Letters Patent.

Patented Dec. 10, 1918.

Application filed November 23, 1917. Serial No. 203,541.

*To all whom it may concern:*

Be it known that I, LUDWIG JUNKER, a citizen of the United States of America, residing at Sheffield, in the county of Colbert and State of Alabama, have invented certain new and useful Improvements in Rivet-Gages, of which the following is a specification.

My invention relates to a gage for determining the diameters and lengths of rivets, bolts and screws most suitable for use in holes of varying diameters and lengths in the material through which these fastenings may be used, and further provides relatively movable scales or tables which are so arranged with relation to a rivet grip measuring slide as to automatically indicate the proper rivet lengths for the various diameters of rivets and the various thickness of material through which these rivets are to be passed.

In the present practice it is necessary for the workman to measure the combined thickness of the plates or material to be riveted, which is often very difficult to do with a straight rule, and also to measure the diameter of the rivet hole in order to use a rivet of proper length so as to form a head of the proper dimension. Knowing the dimensions he must then consult a table to obtain the length. This operation is troublesome as the workman must carry this table or depend upon a foreman, or other uncertain means of information; and even if the table is available an extra opportunity of error is introduced. The use of a rivet not of proper length results in insufficient head and a weak joint, or excessive metal in the head, resulting in a waste of material and an unworkmanlike joint which cannot be tightly driven.

The principal object of my invention is to so relate a measuring scale to the tables that the various requirements of thickness of material and diameter of rivet may be indicated directly, whenever either the tables or the measuring scale is set for a particular condition.

A further object is to facilitate the measuring of the length of rivet holes by providing the slide scale with a hook end adapted to be inserted through and down against the inner edge of the hole when the depth of the hole is measured not only on the slide scale itself but is also indicated on a reverse scale carried on the gage by means of an indicator carried by the slide scale.

In the embodiment illustrated, a number of features of considerable importance to the convenience of the workman and the general utility of the device are introduced, but it is understood that many arrangements of such parts may be made without departing from the scope of my invention.

The preferred embodiment of my invention will be better understood by reference to the accompanying drawings, in which:—

Similar reference numerals refer to similar parts throughout the drawings.

Figure 3:
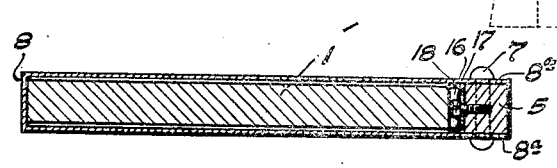
Fig. 3 is a section taken on the line 3—3 of Fig. 1.

The gage comprises a scale bearing handle portion 1 of substantially rectilinear cross section and of any desired length. Arranged laterally across the top on one side 2 of this scale 1 is a transverse column of figures 3 indicating the different standard rivet diameters and each forming a heading for one of a series of vertically arranged columns of figures 4 which gives the correct length of rivet of the particular diameter indicated by its heading required to form the head and "grip" desired. The figures in the vertical columns are so arranged and spaced in sequence that reading from the top down they indicate the increasing length of rivet required for the corresponding increasing length of the rivet "grip" or length of the rivet hole. To measure the grip required I provide a scale or rule 5 adapted to slide along one edge of the scale 1, and to guide it in a longitudinal motion a guiding yoke 6 is passed about the scale 5 and fastened at each end to the scale 1 by rivets 7, which pass through the scale 1 and the respective yoke ends 6ª disposed on opposite sides thereof. A similar yoke 8 is fastened at one end by rivets 9 to the upper end of the sliding scale 5 and passes around the scale 1 and over the columns of figures 4, its upper straight edge 10 being disposed at right angles to the columns 4 and so arranged that for any desired "grip" the proper figures of rivet length appear above this edge 10 in the appropriate column 4, according to the rivet diameter.

Figure 1:
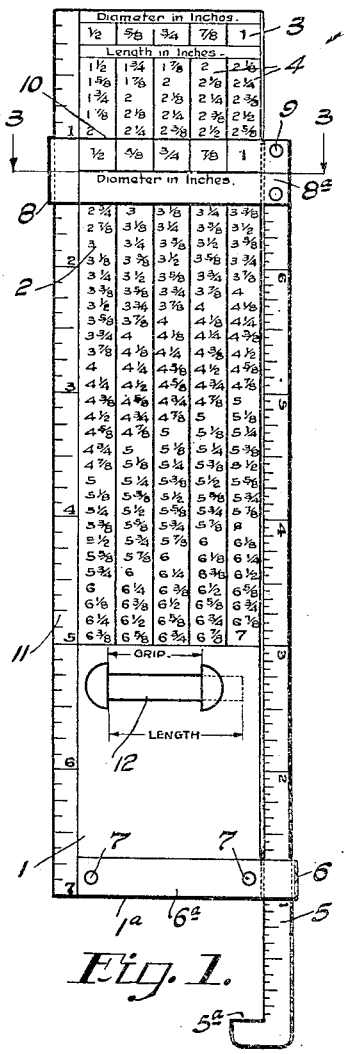
Figure 1 is a view of one side of the gage showing the sliding scale and indicator moved to a one inch position.
Figure 2:
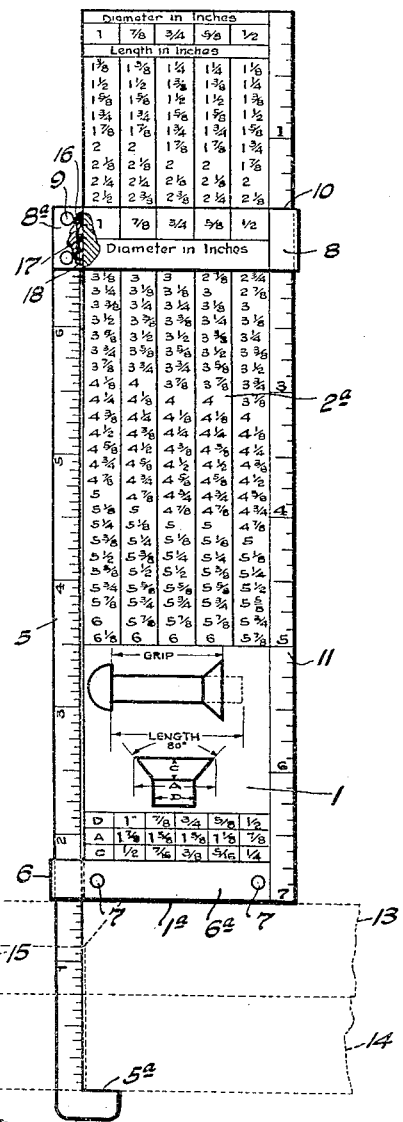
Fig. 2 shows the other side of the gage, and in this view the gage is illustrated in operation to determine the length of a countersunk rivet for two plates, shown in dots.

As illustrated in Fig. 1 the sliding scale has been moved to a position one inch from the outer end of the scale 1 and along the upper edge 10 of the yoke 8 appear the figures 2, 2¼, 2⅜, 2½ and 2⅝, which are the respective lengths required to properly form the "grip" and head on rivets of the respective diameters ½", ⅝", ¾", ⅞" and 1".

In order to facilitate the reading of diameters at any position along the scale, the lateral diameter column is also marked on the yoke 8. A scale 11 is shown along the left edge of the scale 1 and is a reversed checking scale on the sliding scale 5, and if the shouldered end 5ª has been inserted through a hole and the reading thereby made invisible on the scale 5, the "grip" can be read on the scale 11. Thus in Fig. 1 both scales read similarly one inch. Any data, such as the sketch 12 indicating the type of rivet to which the tabulated data refer, may be marked on the open parts of the face 2.

The reverse scale face 2ª, Fig. 2, is similar in operation to the face 2 but has been designed for countersunk heads, whereas the face in Fig. 1, is designed for button and cone head rivets. The gage is shown applied to plates 13 and 14 and through a hole 15 which is to receive a countersunk rivet of a diameter, say ¾ inch, and reading the scale 2ª at the upper edge 10 of the yoke 8 and in the ¾ inch diameter column 4 we find 2⅜ inches to be the required length of the rivet.

To form a slight resistance to the movement of the sliding scale 5, a flat spring 16, the ends of which are bent to press against the edge 19 of the scale, is held by a screw 17 in a recess 18 cut in the inner edge of the sliding scale 5. This spring will serve to hold the slide scale against accidental displacement after taking the measure of the rivet hole.

In operation, the gage end 1ª is placed against the material to be riveted and the scale 5 moved until the shoulder 5ª is against the opposite face of the material. Knowing or measuring the diameter of the hole to be used, the proper length of the rivet is read above the indicator in the proper diameter column 4. The gage may be used to caliper diameters, it being only necessary to insert the rivet or bolt between the shoulder 5ª and the edge 1ª and read the scale 5. The scale 11 may be used as a shop rule.

Having thus described my invention, what I claim as new and desire to secure by Letters Patent, is:—

1. In a gage of the character described, a scale having longitudinal columns of tabulated data, a transverse column having headings for the data displayed in said longitudinal columns, and a slide scale movable relatively to the first mentioned scale and in parallelism with said longitudinal columns and bearing measuring indicia, the spacing of the data in each longitudinal column corresponding to predetermined units of space on said slide scale.

2. In a gage of the character described, a scale having longitudinal columns of tabulated data, a transverse column having heading data for said longitudinal columns, a slide scale movable relatively to the first mentioned scale and in parallelism with said longitudinal columns and bearing measuring indicia, the spacing of the data in each longitudinal column corresponding to predetermined units of space on said slide scale, and slide connections for said scales, one of which is movable with the slide scale along said longitudinal columns of data.

3. In combination, a scale bearing longitudinal columns of tabulated data, each headed by indicia definitive of its tabulated data, and a scale reading from top to bottom thereof, a slide scale with corresponding but reversely arranged measuring indicia reading from bottom to top thereof, slide guides connecting the two scales, and a projection on the bottom end of the slide scale with its upper face in line with the commencement of said measuring indicia on said slide scale, as and for the purposes described.

4. In a device of the character described, a scale having longitudinal columns of data relating to lengths of rivets, each column being headed by an index indicating the diameter of rivets to which the column of data relates, an indicator slide movable along over said columns of data, a slide scale connected to the indicator and having a hook at its free end, there being a measuring scale commencing at the edge of said hook nearest said indicator and increasing from said hook toward said indicator, the data in said columns being arranged in horizontal rows which are relatively spaced a predetermined unit of length of the scale on said slide scale.

In testimony whereof I affix my signature.

LUDWIG JUNKER.

Witness:
W. H. SADLER.

Copies of this patent may be obtained for five cents each, by addressing the "Commissioner of Patents, Washington, D. C."